(12) United States Patent
Horng et al.

(10) Patent No.: US 7,741,799 B2
(45) Date of Patent: Jun. 22, 2010

(54) BRUSHLESS DIRECT CURRENT MOTOR DRIVING CIRCUIT

(75) Inventors: Alex Horng, Kaohsiung (TW); Chung-Ken Cheng, Kaohsiung (TW); Shih-Chang Hsu, Kaohsiung (TW)

(73) Assignee: Sunonwealth Electric Machine Industry Co., Ltd, Kaohsiung (TW)

( * ) Notice: Subject to any disclaimer, the term of this patent is extended or adjusted under 35 U.S.C. 154(b) by 286 days.

(21) Appl. No.: 11/826,156

(22) Filed: Jul. 12, 2007

(65) Prior Publication Data

US 2008/0272722 A1    Nov. 6, 2008

(30) Foreign Application Priority Data

May 1, 2007    (TW) .............................. 96115440 A

(51) Int. Cl.
*H02P 6/00* (2006.01)
(52) U.S. Cl. .............................. 318/400.25; 318/400.01; 318/400.24; 318/700
(58) Field of Classification Search ............ 318/400.25, 318/400.24, 400.01, 700
See application file for complete search history.

(56) References Cited

U.S. PATENT DOCUMENTS

| | | | | |
|---|---|---|---|---|
| 3,749,979 A | * | 7/1973 | Rudolph | 361/57 |
| 4,283,668 A | * | 8/1981 | Cavil | 318/549 |
| 4,476,403 A | * | 10/1984 | Allen | 326/75 |
| 4,516,082 A | * | 5/1985 | Smith et al. | 330/296 |
| 4,849,845 A | * | 7/1989 | Schmitt | 361/56 |
| 7,177,124 B2 | | 2/2007 | Lee | |
| 2003/0155886 A1 | | 8/2003 | Ohiwa et al. | |
| 2004/0265115 A1 | | 12/2004 | Busch | |

* cited by examiner

*Primary Examiner*—Bentsu Ro
*Assistant Examiner*—David S Luo
(74) *Attorney, Agent, or Firm*—Muncy, Geissler, Olds & Lowe, PLLC

(57) ABSTRACT

A brushless DC motor drive circuit includes a drive unit and a transient current suppression circuit. The drive unit comprises a Hall component, a drive component, a first transistor and a second transistor. The Hall component detects the position of a rotor of the DC motor and transmits digital command signals to the drive component; the drive component further generates two complementary digital command signals; and the first and second transistors connect with the drive component respectively. The transient current suppression circuit comprises a first auxiliary transistor and a second auxiliary transistor, wherein the first auxiliary transistor receives one of the complementary digital command signals different from the other one received by the first transistor and the second auxiliary transistor receives the other one of the complementary digital command signals different from the one received by the second transistor.

6 Claims, 4 Drawing Sheets

BRUSHLESS DIRECT CURRENT MOTOR DRIVING CIRCUIT

BACKGROUND OF THE INVENTION

1. Field of the Invention

The present invention relates to a brushless DC (Direct Current) motor drive circuit. More particularly, the present invention relates to a brushless DC motor drive circuit having a transient current suppression circuit to suppress the transient current caused by a motor commutation process.

2. Description of the Related Art

Referring to FIG. 1, a conventional brushless DC motor drive circuit includes a power supply end 91, a voltage regulator circuit 92, a coil set 93, a Hall component 94, a control component 95, and a drive component 96. The power supply end 91 connects to a DC power source to supply a stable DC voltage to the Hall component 94 and the control component 95 while the power supply end 91 supplies a stable DC voltage to the coil set 93 through the voltage regulator circuit 92. The coil set 93 connects between the voltage regulator circuit 92 and the drive component 96. The Hall component 94 has two output ports 941, 942 connected with the control component 95 for transmitting two complementary digital command signals, that is, the commutation signals, wherein the two complementary digital command signals are generated according to the polarity position of a motor rotor (not shown). In order to control the states of a transistor Q1 and a transistor Q2 of the drive component 96, the control component 95 comprises two control ports 951, 952 respectively connecting to the bases of the transistors Q1, Q2.

In normal operation, the commutation signals generated by the Hall component 94 are transmitted to the control component 95 and transformed into a pair of complementary digital control signals such as a HIGH signal and a LOW signal. The complementary digital control signals are respectively transmitted to the bases of the transistors Q1, Q2 of the drive component 96 so as to maintain the transistors Q1, Q2 at different states and constantly switch the transistors Q1, Q2 for commutating the currents of the coil set 93 and therefore running the motor. Furthermore, an ideal operation for controlling the drive component 96 is that the transistor Q1 is at on-state while the transistor Q2 is at off-state, and, contrariously, the transistor Q1 is at off-state while the transistor Q2 is at on-state.

However, when the bases of the transistors Q1, Q2 receive the complementary control signals simultaneously, owing to the transistor characteristics namely the turn-on time of a transistor being shorter than the turn-off time thereof, an overlap time exists wherein both of the transistor Q1 and transistor Q2 are at on-state. Therefore, a transient current is occurred during the overlap time when the drive component 96 commutates the currents of the coil set 93. Referring to FIG. 2, the voltage level and frequency of the transient current is much higher than that of the normal rated current and results in a serious decrease of stability of the motor drive circuit. Besides, the high frequency of the transient current may cause sensitive elements, such as microprocessor, to suffer electromagnetic interference and be at a risk of executing error operation. Moreover, the high voltage level and frequency of the transient current also cause damage to the motor and the drive circuit thereof. Hence, there is a need for improving the motor drive circuit so as to suppress the transient current during the motor operation.

The present invention intends to provide a brushless DC motor drive circuit with a transient current suppression circuit to enforce one of two transistors having a ground connection immediately while the transistor receives an OFF command from a drive component so as to avoid both of the transistors being at on-state. Consequently, the stability of the motor drive circuit is improved, and the damage to the motor and the drive circuit thereof is effectively lowered.

SUMMARY OF THE INVENTION

The primary objective of this invention is to provide a brushless DC motor drive circuit having a transient current suppression circuit to suppress the transient current caused by a motor commutation process. Accordingly, the brushless DC motor drive circuit is so configured to enhance stability of the motor drive circuit, and to lower the damage to the motor and the drive circuit thereof.

The brushless DC motor drive circuit in accordance with an aspect of the present invention includes a power supply end, a drive circuit and a transient current suppression circuit. The power supply end electrically connects with a DC power source for supplying the power of the brushless DC motor drive circuit. The drive circuit comprises a first transistor and a second transistor receiving two complementary digital command signals, that is, ON command signal and OFF command signal. The transient current suppression circuit comprises a first auxiliary transistor and a second auxiliary transistor, wherein the first auxiliary transistor receives one of the complementary digital command signals different from the other one received by the first transistor and the second auxiliary transistor receives the other one of the complementary digital command signals different from the one received by the second transistor.

In a separate aspect of the present invention, a Hall component detects the position of a rotor of a DC motor and generates at least one digital signal.

In a further separate aspect of the present invention, a drive component receives the digital signal and generates two complementary digital command signals to control the first transistor and the second transistor.

In a yet further separate aspect of the present invention, both of the first transistor and the second transistor have a first pin, with the first pins of the first and second transistors receiving the two complementary digital command signals respectively.

In a yet further separate aspect of the present invention, the first and second auxiliary transistors both have a first pin and a second pin, with the first pin of the first auxiliary transistor and the second pin of the second auxiliary transistor jointly connecting to the first pin of the second transistor, with the first pin of the second auxiliary transistor and the second pin of the first auxiliary transistor jointly connecting to the first pin of the first transistor.

In a yet further separate aspect of the present invention, the power supply end directly provides the Hall component and the drive component with a DC voltage.

In a yet further separate aspect of the present invention, a voltage regulator circuit parallel connected with the power supply end.

In a yet further separate aspect of the present invention, a coil set having a first coil and a second coil, with one end of the first coil connecting with one end of the second coil and the voltage regulator circuit, with the other ends of the first and second coils connecting to the first and second transistors respectively.

In a yet further separate aspect of the present invention, the first and second auxiliary transistors both have a third pin connecting to ground.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 3:
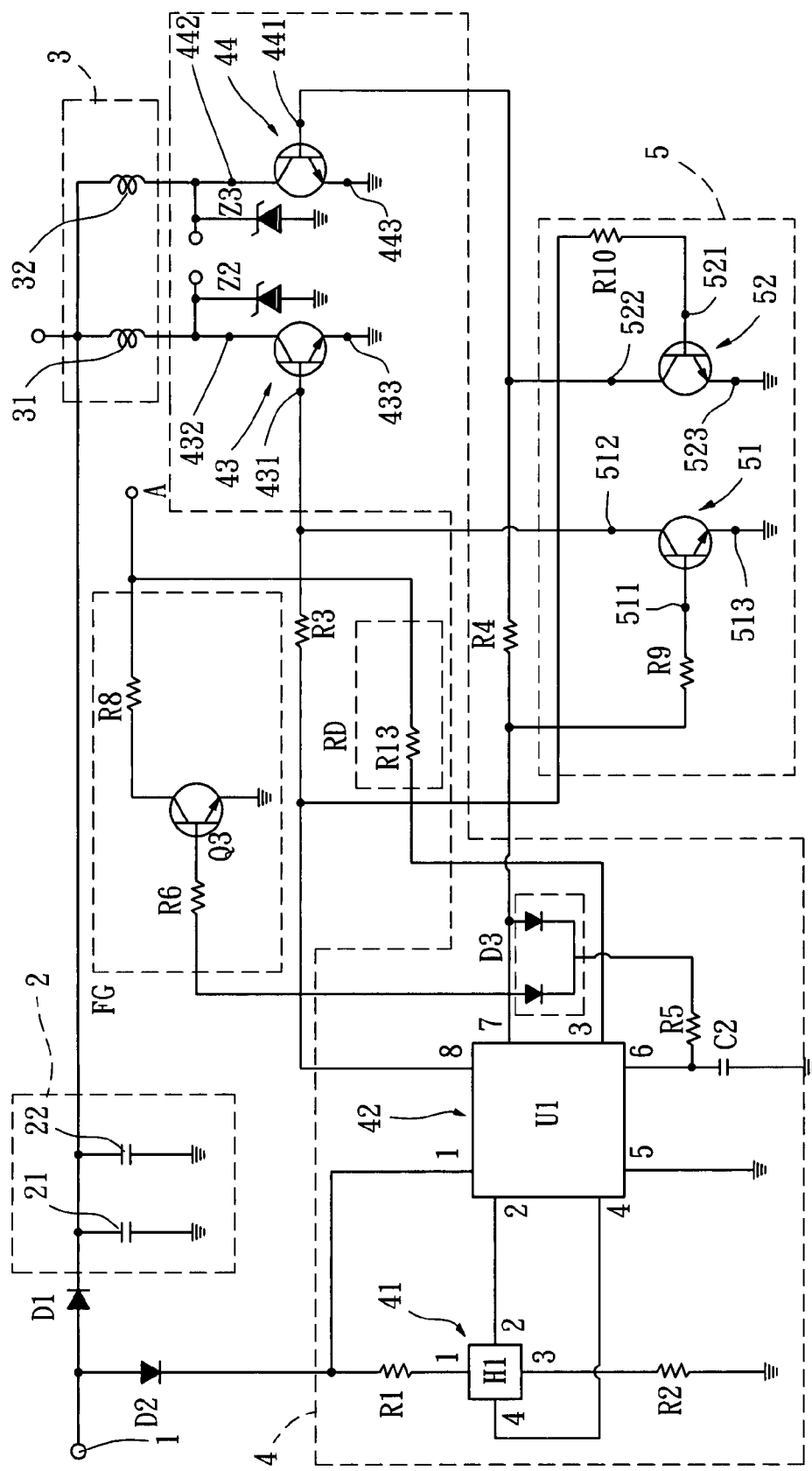
FIG. 3 is a schematic circuitry diagram of a brushless DC motor drive circuit in accordance with a preferred embodiment of the present invention.

Turning now to FIG. 3, a schematic circuitry diagram illustrating a brushless DC motor drive circuit in accordance with a preferred embodiment of the present invention is provided. The brushless DC motor drive circuit comprises a power supply end 1, a voltage regulator circuit 2, a coil set 3, a drive unit 4 and a transient current suppression circuit 5. The power supply end 1 connects to a DC power source for providing a DC voltage to the drive unit 4 directly and to the coil set 3 through the voltage regulator circuit 2. The currents in the coil set 3 are under the control of the drive unit 4. The transient current suppression circuit 5 suppresses the transient current caused by the commutation of the motor drive circuit.

A diode D1 connects between the power supply end 1 and the voltage regulator circuit 2 which is connected to the coil set 3, and another diode D2 connects between the power supply end 1 and the drive unit 4. With the disposition of the diodes D1, D2, counter-currents which may feed to the power supply end 1 from the coil set 3 and the drive unit 4 are omitted and thereby the power quality is held. Further more, the voltage regulator circuit 2 comprises two capacitors 21, 22 which are parallel connected with the power supply end 1 respectively for reducing the ripple effect and increasing the stability of the DC voltage supplied by the power supply end 1.

Referring again to FIG. 3, according to a conventional design of a two-phase motor, the coil set 3 includes a first coil 31 and a second coil 32. Each of the first and second coils 31, 32 provides an end to connect with each other and jointly connect to the voltage regulator circuit 2, with each of the first and second coils 31, 32 providing another end to connect to the drive unit 4.

The drive unit 4 includes a Hall component 41, a drive component 42, a first transistor 43 and a second transistor 44. The Hall component 41 detects the position of a rotor of the DC motor and transmits digital command signals to the drive component 42, and the drive component 42 further generates two complementary digital command signals namely an ON command signal and an OFF command signal. The first transistor 43 has a first pin 431, a second pin 432 and a third pin 433 while the second transistor 44 has a first pin 441, a second pin 442 and a third pin 443. The first pins 431, 441 connect to the drive component 42 for receiving the two complementary digital command signals respectively; the second pins 432, 442 connect to the first and second coils 31, 32 respectively; and the third pins 433, 443 provide the transistors 43, 44 with ground connections. Accordingly, the first pins 431, 441 of the first and second transistors 43, 44 individually receive the two complementary digital command signals (ON command signal and OFF command signal) generated by the drive component 42, and therefore the transistors 43, 44 are maintained between on-state and off-state. As a result, under the control of the transistors 43, 44, currents pass through the first and second coils 31, 32 alternately. Said components of the drive unit 4 can be integrated into one drive IC. Moreover, even though the presently preferred embodiment provides the drive unit 4 with only two transistors 43, 44, it will be understood by one that the amount of the transistors is variable for matching a various number of the phases of the DC motor.

Still referring to FIG. 3, The transient current suppression circuit 5 includes a first auxiliary transistor 51 and a second auxiliary transistor 52. The first auxiliary transistor 51 has a first pin 511, a second pin 512 and a third pin 513 while the second auxiliary transistor 52 has a first pin 521, a second pin 522 and a third pin 523. The first pin 511 of the first auxiliary transistor 51 and the second pin 522 of the second auxiliary transistor 52 connects to the first pin 441 of the second transistor 44 together. Meanwhile, the first pin 521 of the second auxiliary transistor 52 and the second pin 512 of the first auxiliary transistor 51 connects to the first pin 431 of the first transistor 43 together. The third pins 513, 523 provide the first and second auxiliary transistors 51, 52 with ground connections.

The brushless DC motor drive circuit of the present invention further comprises a frequency generator FG and a rotation detector RD. The frequency generator FG provides a buffered signal from the Hall component 41, and the rotation detector RD detects if the rotor is rotating or not.

Still referring to FIG. 3, when the brushless DC motor drive circuit of the present invention is started, one of the two complementary digital command signals is transmitted from the drive unit 4 to the first pins 431, 521 of the first transistor 43 and the second auxiliary transistor 52; meanwhile, the other command signal is transmitted from the drive unit 4 to the first pins 441, 511 of the second transistor 44 and the first auxiliary transistor 51. Therefore, ideally, the state of the first auxiliary transistor 51 is different from that of the first transistor 43 and the state of the second auxiliary transistor 52 is also different from that of the second transistor 44 while the first and second transistors 43, 44 are at different states.

When the ON command signal transmits to the first transistor 43 and the second auxiliary transistor 52 with the OFF command signal transmitting to the second transistor 44 simultaneously, the transistors 43, 52 turns on immediately but the second transistor 44 remains at on-state temporarily. Because of the on-state of the second auxiliary transistor 52, the second pin 522 of the second auxiliary transistor 52 is grounded, and thereby the first pin 441 of the second transistor 44 is also grounded. Consequently, the potential difference between the first and second pins 441, 442 of the second transistor 44 is rapidly increased, and therefore the turn-off time of the second transistor 44 is greatly reduced. Alternatively, once the second transistor 44 and the first auxiliary transistor 51 receives the ON command signal while the first transistor 43 receives the OFF command signal at the meantime, the second pin 512 of the first auxiliary transistor 51 connects to ground immediately. Thereby the grounding of the first pin 431 of the first transistor 43 is provided and the turn-off time of the first transistor 43 is greatly reduced.

As a result, when the motor executes the commutation, the transient currents are reduced because of the substantial decrease of an overlap time wherein both of the transistors 43, 44 are at on-state, and the stability of the motor drive circuit is thereby enhanced.

Figure 4:
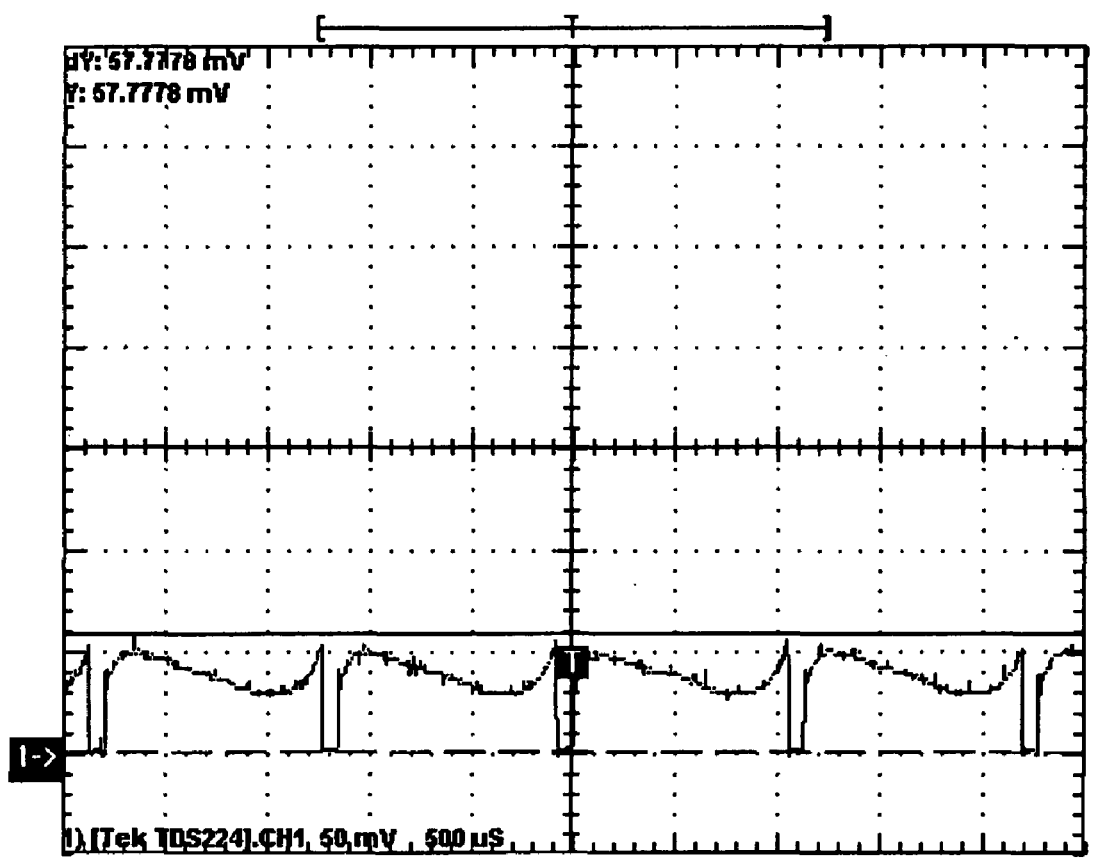
FIG. 4 is a timing diagram relating to the current at a point between the voltage regulator circuit and the coil set of the conventional brushless DC motor drive circuit in FIG. 3 in accordance with the preferred embodiment of the present invention.

Turning now to FIG. 4, a timing diagram relating to the current is shown. Obviously, the transient current suppression circuit 5 suppresses the transient current induced by the motor commutation process efficiently.

Figure 1:
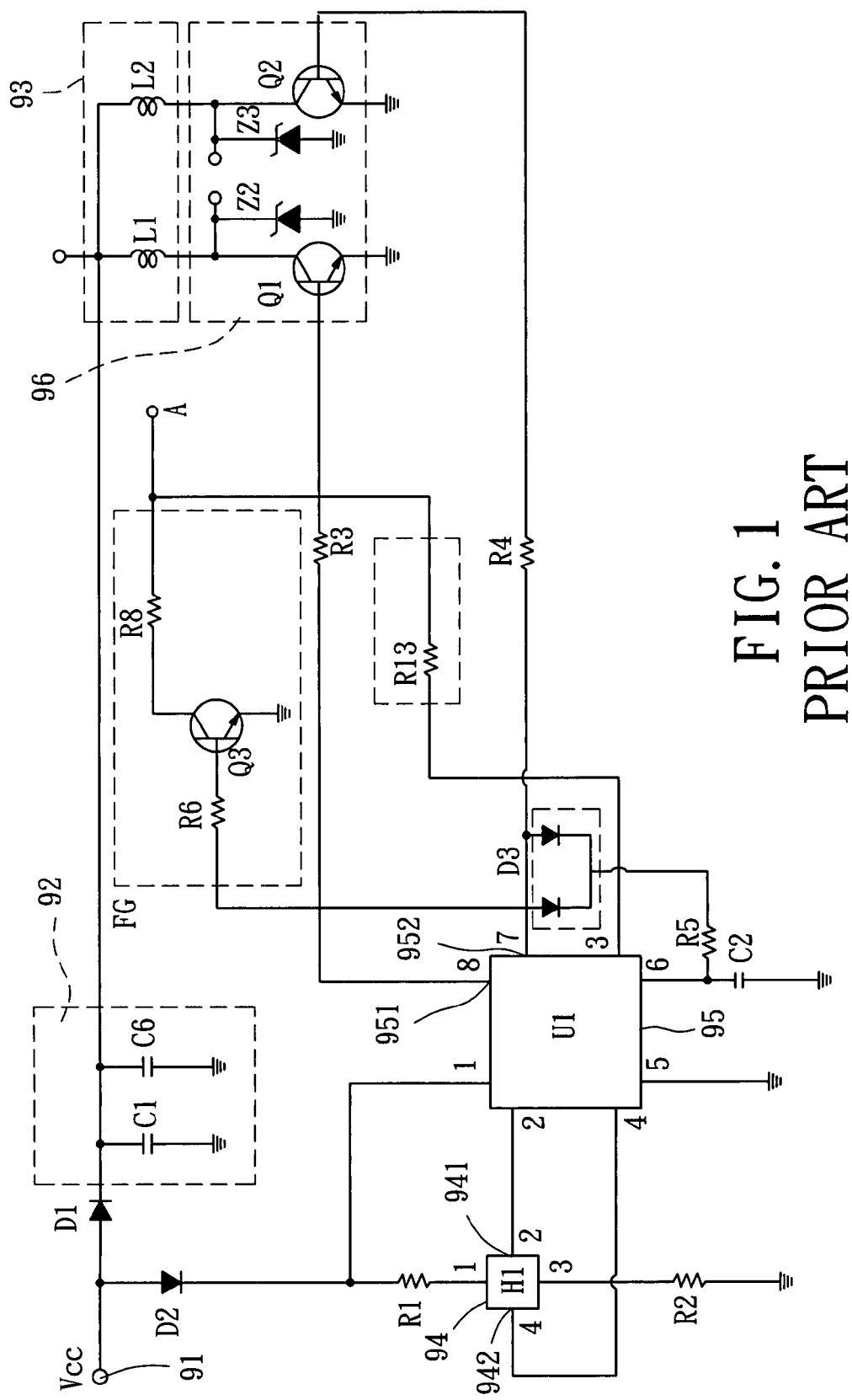
FIG. 1 is a schematic circuitry diagram of a conventional brushless DC motor drive circuit in accordance with the prior art.
Figure 2:
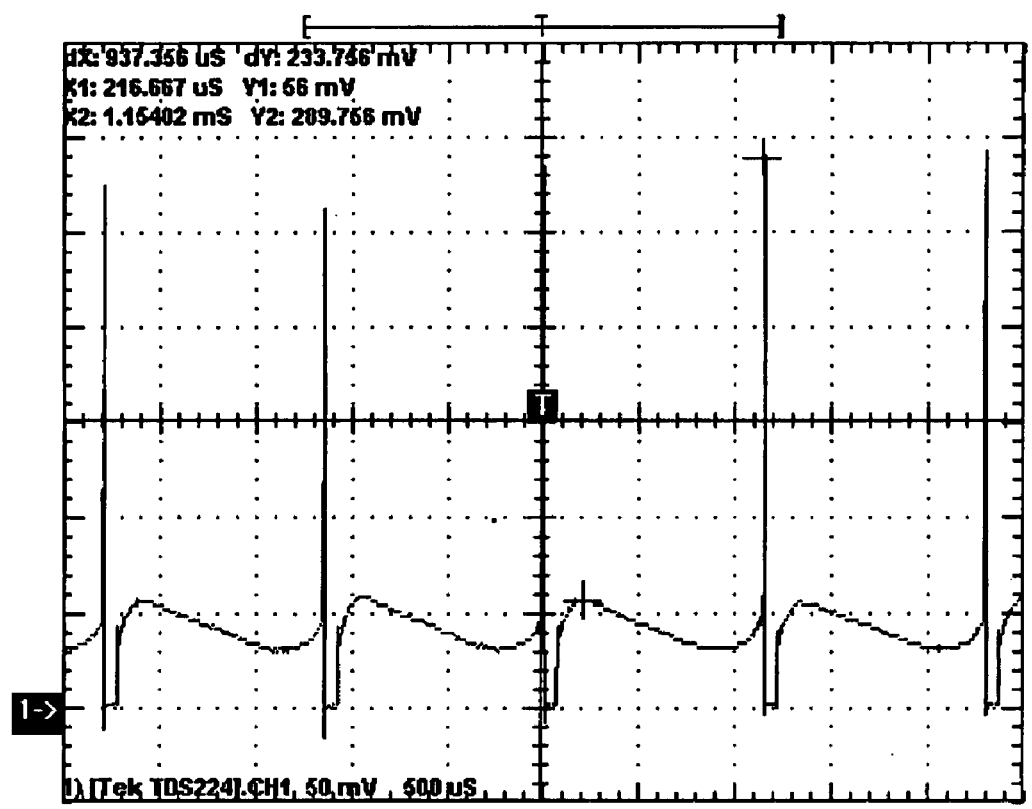
FIG. 2 is a timing diagram relating to the current at a point between the voltage regulator circuit and the coil set of the conventional brushless DC motor drive circuit in FIG. 1 in accordance with the prior art.

As has been discussed above, referring back to FIG. 1, the conventional brushless DC motor drive circuit controls the coil set 95 with the control component 95 and the transistors Q1, Q2 only, and, as a result, there exists large transient currents during the motor commutation process. Conversely, the brushless DC motor drive circuit in accordance with the present invention includes the transient current suppression circuit 5 with the first and second auxiliary transistors 51, 52 receiving contrary digital control signals of the first and second transistor 43, 44 respectively. Thereby, the transient current of the motor is substantially suppressed and the stability of the motor drive circuit is also improved.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brushless DC motor driver circuit, comprising:

a power supply end electrically connected with a DC power source for supplying the power of the brushless DC motor driver circuit;

a drive circuit comprising a first transistor and a second transistor receiving two complementary digital command signals respectively, with the two complementary digital command signals changing between an ON command signal and an OFF command signal; and a transient current suppression circuit comprising a first auxiliary transistor and a second auxiliary transistor, with the first auxiliary transistor receiving one of the complementary digital command signals different from the other one received by the first transistor and the second auxiliary transistor receiving the other one of the complementary digital command signals different from the one received by the second transistor, wherein each of the first transistor and the second transistor has a first pin with the first pins of the first and second transistors receiving the two complementary digital signals, and wherein each of the first and second auxiliary transistors has a first pin, a second pin, and a third pin, with the first pin of the first auxiliary transistor and the second pin of the second auxiliary transistor jointly connecting to the first pin of the second transistor, with the first pin of the second auxiliary transistor and the second pin of the first auxiliary transistor jointly connecting to the first pin of the first transistor, with the third pins connecting to ground.

2. The brushless DC motor drive circuit as defined in claim 1, further comprising a Hall component to detect the position of a rotor of a DC motor and generate at least one digital signal.

3. The brushless DC motor drive circuit as defined in claim 2, further comprising a drive component to receive the digital signal and generate the two complementary digital command signals to control the first transistor and the second transistor.

4. The brushless DC motor drive circuit as defined in claim 3, wherein the power supply end directly provides the Hall component and the drive component with a DC voltage.

5. The brushless DC motor drive circuit as defined in claim 3, further comprising a voltage regulator circuit parallel connected with the power supply end.

6. The brushless DC motor drive circuit as defined in claim 5, further comprising a coil set having a first coil and a second coil, with each of the first coil and second coil providing an end to jointly connect with the voltage regulator circuit, with each of the first coil and the second coil providing another end to connect with the first and second transistors respectively.

* * * * *